(12) United States Patent
Hurewitz

(10) Patent No.: US 7,953,652 B1
(45) Date of Patent: May 31, 2011

(54) PROFIT MODEL FOR NON-EXECUTION SERVICES

(75) Inventor: Barry S. Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 1255 days.

(21) Appl. No.: 11/450,994

(22) Filed: Jun. 12, 2006

(51) Int. Cl.
*G06Q 40/00* (2006.01)
(52) U.S. Cl. .............................. 705/35; 705/30; 705/34
(58) Field of Classification Search ................... 705/35, 705/30, 36 R
See application file for complete search history.

(56) References Cited

U.S. PATENT DOCUMENTS

| | | |
|---|---|---|
| 4,710,763 A | 12/1987 | Franke et al. |
| 5,128,860 A | 7/1992 | Chapman |
| 5,502,637 A | 3/1996 | Beaulieu et al. |
| 5,630,070 A | 5/1997 | Dietrich et al. |
| 5,822,410 A | 10/1998 | McCausland et al. |
| 5,864,853 A | 1/1999 | Kimura et al. |
| 5,913,201 A | 6/1999 | Kocur |
| 5,940,843 A | 8/1999 | Xucknovich et al. |
| 5,963,911 A | 10/1999 | Walker et al. |
| 5,968,121 A | 10/1999 | Logan et al. |
| 6,029,146 A | 2/2000 | Hawkins et al. |
| 6,049,599 A | 4/2000 | McCausland et al. |
| 6,292,830 B1 | 9/2001 | Taylor et al. |
| 6,324,523 B1 | 11/2001 | Killeen, Jr. et al. |
| 6,330,545 B1 | 12/2001 | Suh |
| 6,374,227 B1 | 4/2002 | Ye |
| 6,381,744 B2 | 4/2002 | Nanos et al. |
| 6,415,269 B1 | 7/2002 | Dinwoodie |
| 6,470,325 B1 | 10/2002 | Leemhuis |
| 6,507,825 B2 | 1/2003 | Suh |
| 6,510,419 B1 | 1/2003 | Gatto |
| 6,519,571 B1 | 2/2003 | Guheen et al. |
| 6,671,674 B1 | 12/2003 | Anderson et al. |
| 6,681,211 B1 | 1/2004 | Gatto |
| 6,968,317 B1 | 11/2005 | Wallace et al. |
| 7,072,858 B1 | 7/2006 | Litzow et al. |

(Continued)

FOREIGN PATENT DOCUMENTS

JP 2003/345971 5/2003

(Continued)

OTHER PUBLICATIONS http://74.125.155.132/scholar?q=cache:zOwFRkK1g24J:scholar.google.com/+research+soft+dollar+profit&hl=en&as_sdt=80000000000000 Soft Dollar Brokerage, porfolio management, and private information: agency theory and evidence. Stephen M. Horan Jul. 2000.*

(Continued)

*Primary Examiner* — James A Kramer
*Assistant Examiner* — James A Vezeris
(74) *Attorney, Agent, or Firm* — K&L Gates LLP

(57) ABSTRACT

Methods of pricing non-execution services provided by a firm comprising an execution service provider and a non-execution service provider. The methods may comprise the steps of accruing a payment for execution and non-execution services from an external client and allocating a first portion of the payment to an execution service provider and a second portion of the payment to a non-execution service provider. The methods may also comprise the steps of calculating a cost of providing the non-execution services, and calculating a profit of the non-execution service provider considering the cost of providing the non-execution services and the second portion of the payment.

31 Claims, 8 Drawing Sheets

U.S. PATENT DOCUMENTS

| | | | |
|---|---|---|---|
| 7,171,471 | B1 | 1/2007 | Nair |
| 2002/0002522 | A1* | 1/2002 | Clift .............................. 705/36 |
| 2002/0016752 | A1 | 2/2002 | Suh |
| 2002/0035534 | A1 | 3/2002 | Buist et al. |
| 2002/0055901 | A1 | 5/2002 | Gianakouros et al. |
| 2002/0065758 | A1 | 5/2002 | Henley |
| 2002/0111890 | A1 | 8/2002 | Sloan et al. |
| 2002/0198815 | A1 | 12/2002 | Greifeld et al. |
| 2003/0083926 | A1 | 5/2003 | Semret et al. |
| 2003/0101124 | A1 | 5/2003 | Semret et al. |
| 2003/0144932 | A1 | 7/2003 | Martin et al. |
| 2003/0158807 | A1 | 8/2003 | Takeshi |
| 2003/0225666 | A1 | 12/2003 | Murtaugh et al. |
| 2003/0236721 | A1 | 12/2003 | Plumer et al. |
| 2004/0010592 | A1 | 1/2004 | Carver et al. |
| 2004/0088206 | A1 | 5/2004 | Thompson et al. |
| 2004/0111308 | A1 | 6/2004 | Yakov |
| 2004/0138998 | A1 | 7/2004 | Lawrence |
| 2004/0181378 | A1 | 9/2004 | Gilmore |
| 2005/0096950 | A1 | 5/2005 | Caplan et al. |
| 2005/0097028 | A1 | 5/2005 | Watanabe et al. |
| 2005/0125274 | A1 | 6/2005 | Nastacio et al. |
| 2005/0172083 | A1 | 8/2005 | Meiri |
| 2005/0216323 | A1 | 9/2005 | Weild, IV |
| 2005/0240456 | A1 | 10/2005 | Ward et al. |
| 2005/0246264 | A1 | 11/2005 | Plunkett |
| 2005/0261922 | A1 | 11/2005 | Marchisotto et al. |
| 2005/0261999 | A1 | 11/2005 | Rowady, Jr. |
| 2005/0278240 | A1 | 12/2005 | Delenda |
| 2006/0149657 | A1* | 7/2006 | Weild .............................. 705/37 |
| 2006/0167703 | A1 | 7/2006 | Yakov |
| 2007/0264986 | A1 | 11/2007 | Warrillow et al. |
| 2008/0021805 | A1 | 1/2008 | Hansen et al. |
| 2008/0021844 | A1* | 1/2008 | Sanwal et al. .............. 705/36 R |

FOREIGN PATENT DOCUMENTS

| | | |
|---|---|---|
| JP | 2003/288469 | 10/2003 |

OTHER PUBLICATIONS

Commission Recatpure Success by Schwartz "Traders Magazine" Oct 1, 2000.*
Investorwords.com "Profit" The positive gain from an investment or business operation after subtracting for all expenses. opposite of loss.*
Notice of Allowance mailed Dec. 14, 2009 for U.S. Appl. No. 10/856,442.
Notice of Allowance mailed Nov. 17, 2009 for U.S. Appl. No. 10/857,400.
Interview Summary mailed Nov. 17, 2009 for U.S. Appl. No. 10/857,400.
Mehta, N. "Sellside Research Must Try Harder: Rocked by Scandals, Institutional Sellside Research Will Never by the Same", Traders Magazine, New York, Dec. 1, 2003, p. 1 (6 pages).
Final Office Action mailed Aug. 4, 2009 for U.S. Appl. No. 10/856,442.
Final Office Action mailed Aug. 3, 2009 for U.S. Appl. No. 10/857,400.
Notice of Allowance mailed Jul. 9, 2009 for U.S. Appl. No. 10/939,087.
Tumolo, M., Business-to-Business Exchanges, Information Systems Management; Spring 2001, vol. 18, Issue 2, 25 pages.
Anonymous, "LA Based Credit Union Installs Harland's Touche Solution", May 2002, Bank Systems and Technology, V39N5, 2 pages.
Anonymous, "Business Objects Launches Ithena, Inc.: New Subsidiary Defines First E-Customer Intelligence Analytic Application" Feb. 9, 2000, Business Wire, 0006.
Interview Summary mailed Aug. 27, 2009 for U.S. Appl. No. 10/856,442.
Notice of Allowance mailed Oct. 6, 2009 for U.S. Appl. No. 10/857,526.
U.S. Appl. No. 12/706,054, filed Feb. 16, 2010.
U.S. Appl. No. 12/784,787, filed May 21, 2010.
Horan et al., "Portfolio Management, Private Information, and Soft Dollar Brokerage: Agency Theory and Evidence," first draft Jul. 1996, current draft Jul. 1999.
"Code of Practice for Enhanced Commissions Processing," Thomson Financial esg, OASYS, Sep. 28, 2000, pp. 1-69.
Levitt, A., "Speech by SEC Chairman: Remarks before the 2000 Annual Meeting Securities Industry Association," US Securities and Exchange Commission, Boca Raton, Florida, Nov. 9, 2000.
Brennan et al., "Brokerage Commission Schedules," The Journal of Finance, vol. 48, No. 4, Sep. 1993, pp. 1379-1402.
Boni, L. et al., "Solving the Sell-Side Research Problem: Insights from Buy-Side Professionals," working paper, University of New Mexico, Aug. 8, 2002.
McCafferty, J., "Reform of sell-side research is creating a variety of new headaches for corporations," CFO Magazine, May 1, 2003.
"Bracing for Disclosure of Soft Dollars," Wall Street & Technology, Aug. 27, 2004.
Myner, "Institutional Investment in the United Kingdom: A Review," Mar. 6, 2001 ("The Myner's Report").
U.S. Dept. of Energy, "Activity Based Costing," Cost Estimating Guide, Chap. 24, Mar. 1997.
Roztocki et al., "An Integrated Activity-Based Costing and Economic Value Added System As An Engineering Management Tool for Manufacturers," 1998 ASEM National Conference Proceedings, Virginia Beach, Oct. 1-3, 1998, pp. 77-84.
Granof et al., "Using Activity-Based Costing to Manage More Effectively," PriceWaterhouseCoopers Report, Jan. 2000.
"2004 US Equity Research Industry Outlook—Table of Contents", Integrity Research Associates (3 pages).
"The Commission System", Treatise, Broker-Dealer-Law-and-Regulation, Section 10.02 The Commission System, 2008 (10 pages).
Anonymous, "Sell-Side Story", Prweek (U.S. ed.), New York, Jul. 7, 2003, p. 17 (5 pages), vol. 6, Issue 26.
Boni, Leslie et al., "Wall Street Research: Will New Rules Change Its Usefulness?", Financial Analysts Journal, May/Jun. 2003 (7 pages), vol. 59, Issue 3, ABI/INFORM Global.
Thomson, "Best Practices Report: The Broker Voting Process, Commentary and Analysis", Thomson Extel Surveys, Feb. 2008 (5 pages).
Business Editors/High-Tech Writers, "Independent Research Group Builds Equity Research Team", Business Wire, New York, Mar. 13, 2003, p. 1 (5 pages).
Chapman, P., "Keeping a Score for Traders: A Database That Keeps Track of Customer Business", Traders Magazine, New York, Dec. 1, 2003, p. 1 (3 pages).
Chen, Z., "Buy-Side and Sell-Side: The Industrial Organization of Information Production in the Securities Industry", University of Pennsylvania—The Wharton School, Mar. 2004, pp. 1-64.
"Equity Research Outlays Projected to Nearly Double in Next Five Years", PR Newswire, New York, Jun. 21, 2004, p. 1 (2 pages).
"Buy-Side Still Values Sell-Side Research, Study Says", FinanceTech, Mar. 26, 2008 (2 pages).
"Facing the Charges for Research: The Way Fund Managers Bill Their Clients Needs Reform: [London 1st Edition]", Financial Times, London (UK), Oct. 13, 2003, p. 20 (3 pages).
"The Future of Equity Research: Where Will the Investment Community Look?", PR Newswire, New York, Feb. 4, 2004, pg. (2 pages).
"National Express Group PLC Analyst and Investor Seminar": May 7, 2004, p. 1.
"Prudential Financial to Host Analyst and Investor Conference in Tokyo", Sep. 23, 2004, Business Wire, Jan. 23, 2004.
"An Interview with Mark Coker, Founder of Best Calls", 2000, 4 pages.
"Analyst Meeting", Dell Inc., Austin, Texas, Apr. 8, 2004, 55 pages.
"International Managers Feel Pinch of Sellside's Cost-Cutting Moves", Fund Action, New York, Jun. 30, 2003, p. 1 (2 pages).
Friedlander, J., "Independents to Gobble Research Pie in Future Study says Industry to Nearly Triple, Taking Money from Big Street Firms", The Investment Dealers' Digest: IDD, New York, Jul. 5, 2004, p. 1 (2 pages).
Nocera, J., "Wall Street on the Run", Fortune, New York, Jun. 14, 2004, vol. 149, Issue 12, p. 107 (6 pages).

Leone, M., "The Flight of the Sell-Side Aalyst", CFO.com, Boston, Jul. 8, 2004, p. 1 (2 pages).
McCafferty, J., "Reform of Sell-Side Research is Creating a Variety of New Headaches for Corporations," CFO Magazine, May 1, 2003.
Mehta, N., "Sellside Research Must Try Harder: Rocked by Scandals, Institutional Sellside Research Will Never be the Same", Traders agazine, New York, Dec. 1, 2003, p. 1 (6 pages).
Milhench, C., "Global Brokers Survey: Rethinking the Research Model", Global Investor, London, Sep. 2004, p. 1 (29 pages).
Krantz, M., "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea...
Munk, C. Winokur, "Analysts' Roles Evolve with Incentives", Wall Street Journal (Eastern Edition), New York, May 21, 2003, p. 1 (4 pages).
Chapman, P., "Rating Sellside Services: Software Made for Buyside Spendthrifts", Traders Magazine, New York, May 1, 2004, p. 1 (3 pages).
SEC-Rel, SEC-Docket 79 SEC-Docket 2540-113, "United States of America Before the Securities and Exchange Commission", Release No. ID-225, Administrative Proceeding File No. 3-10607, Mar. 19, 2003 (13 pages).
"Sell-Side Analysts Heading to the Buy Side", Real Estate Finance and Investment, New York, Nov. 3, 2003, p. 1 (2 pages).
Sisk, M., "The Best of the Buy Side—II Magazine Platinum", Institutional Investor, (International Edition), New York, Jun. 2003, p. 1 (6 pages).
Stock, H., "Most Buy Siders Use Sell-Side Reports for Tips, Despite Conflicts", Investor Relations Business, New York, May 12, 2003, p. 1 (4 pages).
Gullapalli, D., "Moving the Market—Tracking the Numbers/Street Sleuth: On Governance, Wall Street May Carry Big Stick; After a Report by Goldman, Companies Make Changes; Right Role for 'Sell Side'?", Wall Street Journal, (Eastern Edition), New York, Aug. 31, 2004, p. C.3 (2 pages).
"Eliot Spitzer on His Fund Blitzkrieg", Business Week (Online), New York, Sep. 18, 2003, p. 1 (3 pages).
"The October Revolution on Wall Street: Strategies for adapting to the changing research landscape," Coffin Communications Group, Jun. 2003.
Boni, et al., "Wall Street's Credibility Problem: Misaligned Incentives and Dubious Fixes?," 5th Annual Brookings-Wharton Conference on the Future of Securities Markets, Brookings-Wharton Papers on Financial Services, 2002.
Non-Final Office Action mailed Mar. 19, 2008 for U.S. Appl. No. 10/856,442.
Non-Final Office Action mailed Dec. 11, 2008 for U.S. Appl. No. 10/856,442.
Interview Summary mailed Mar. 17, 2009 for U.S. Appl. No. 10/856,442.
Non-Final Office Action mailed May 21, 2008 for U.S. Appl. No. 10/857,526.
Non-Final Office Action mailed Mar. 16, 2009 for U.S. Appl. No. 10/857,526.
Interview Summary mailed May 15, 2009 for U.S. Appl. No. 10/857,526.
Non-Final Office Action mailed May 6, 2008 for U.S. Appl. No. 10/857,400.
Interview Summary mailed Jul. 14, 2008 for U.S. Appl. No. 10/857,400.
Non-Final Office Action mailed Dec. 9, 2008 for U.S. Appl. No. 10/857,400.
Interview Summary mailed Apr. 2, 2009 for U.S. Appl. No. 10/857,400.
Non-Final Office Action mailed Jan. 30, 2008 for U.S. Appl. No. 10/939,087.
Interview Summary mailed Apr. 11, 2008 for U.S. Appl. No. 10/939,087.
Interview Summary mailed May 16, 2008 for U.S. Appl. No. 10/939,087.
Non-Final Office Action mailed Sep. 17, 2008 for U.S. Appl. No. 10/939,087.
U.S. Appl. No. 10/856,442, filed May 28, 2004.
U.S. Appl. No. 10/857,526, filed May 28, 2004.
U.S. Appl. No. 10/857,400, filed May 28, 2004.
U.S. Appl. No. 10/939,087, filed Sep. 10, 2004.

* cited by examiner

CLIENT PRODUCT REVENUE TABLE — 200

| CLIENT | PRODUCT | REGION | REVENUES | PERIOD |
|---|---|---|---|---|
| CLIENT 1 | CORE | N.A. | $3M | 2006 Q1 |
| CLIENT 1 | CORE | EUROPE | $7M | 2006 Q1 |
| CLIENT 1 | CORE | ASIA | $5M | 2006 Q1 |
| CLIENT 1 | CORE | JAPAN | $7M | 2006 Q1 |
| CLIENT 1 | DERIV | AMERICA | $3M | 2006 Q1 |
| CLIENT 1 | DERIV | EUROPE | $5M | 2006 Q1 |
| CLIENT 1 | DERIV | ASIA | $2M | 2006 Q1 |
| CLIENT 1 | DERIV | JAPAN | $1M | 2006 Q1 |
| CLIENT 1 | PORTFOLIO | EUROPE | $1M | 2006 Q1 |
| CLIENT 1 | EFS | GLOBAL | $20M | 2006 Q1 |
| CLIENT 2 | CORE | N.A. | $5M | 2006 Q1 |
| CLIENT 2 | CORE | EUROPE | $3M | 2006 Q1 |
| CLIENT 2 | CORE | ASIA | $2M | 2006 Q1 |
| CLIENT 2 | CORE | JAPAN | $1M | 2006 Q1 |

SERVICES CLIENT REVENUE SHARE TABLE — 300

| CLIENT | PRODUCT | REGION | GROUP | PERCENTAGE | PERIOD |
|---|---|---|---|---|---|
| CLIENT 1 | CORE | N.A. | RESEARCH | 30% | 2006 Q1 |
| CLIENT 1 | CORE | EUROPE | RESEARCH | 40% | 2006 Q1 |
| CLIENT 1 | CORE | ASIA PACIFIC | RESEARCH | 35% | 2006 Q1 |
| CLIENT 1 | CORE | JAPAN | RESEARCH | 45% | 2006 Q1 |
| CLIENT 1 | DERIV | N.A. | RESEARCH | 5% | 2006 Q1 |
| CLIENT 1 | DERIV | EUROPE | RESEARCH | 5% | 2006 Q1 |
| CLIENT 1 | DERIV | ASIA PACIFIC | RESEARCH | 10% | 2006 Q1 |
| CLIENT 1 | DERIV | JAPAN | RESEARCH | 1% | 2006 Q1 |
| CLIENT 1 | PORTFOLIO | EUROPE | RESEARCH | 10% | 2006 Q1 |
| CLIENT 1 | EFS | GLOBAL | RESEARCH | 5% | 2006 Q1 |
| CLIENT 2 | CORE | N.A. | RESEARCH | 50% | 2006 Q1 |
| CLIENT 2 | CORE | EUROPE | RESEARCH | 60% | 2006 Q1 |
| CLIENT 2 | CORE | ASIA | RESEARCH | 40% | 2006 Q1 |
| CLIENT 2 | CORE | JAPAN | RESEARCH | 5% | 2006 Q1 |
| CLIENT 2 | CORE | N.A. | ICM | 5% | 2006 Q1 |
| CLIENT 2 | CORE | EUROPE | ICM | 10% | 2006 Q1 |
| CLIENT 2 | CORE | ASIA | ICM | 5% | 2006 Q1 |

CLIENT GROUP-TEAM REVENUE ALLOCATIONS TABLE 400

| CLIENT | PRODUCT | CLIENT REGION | GROUP | TEAM | TEAM REGION | ALLOCATION % | GROUP |
|---|---|---|---|---|---|---|---|
| CLIENT 1 | ALL | N.A. | RESEARCH | MEDIA | N.A. | 2% | 2006 Q1 |
| CLIENT 1 | ALL | N.A. | RESEARCH | PUBLISHING | N.A. | 3% | 2006 Q1 |
| CLIENT 1 | ALL | N.A. | RESEARCH | BIOTECH | N.A. | 5% | 2006 Q1 |
| CLIENT 1 | ALL | N.A. | RESEARCH | CONSUMER | N.A. | 3% | 2006 Q1 |
| CLIENT 1 | ALL | N.A. | RESEARCH | SEMI CONDUCTOR | N.A. | 1% | 2006 Q1 |
| CLIENT 1 | ALL | N.A. | RESEARCH | BANKS | N.A. | 1% | 2006 Q1 |
| CLIENT 1 | ALL | N.A. | RESEARCH | STRATEGY | N.A. | 7% | 2006 Q1 |
| CLIENT 1 | ALL | N.A. | RESEARCH | ECONOMY | N.A. | 3% | 2006 Q1 |
| CLIENT 1 | ALL | N.A. | RESEARCH | LUXURY | N.A. | 2% | 2006 Q1 |
| CLIENT 1 | ALL | N.A. | RESEARCH | MEDIA | N.A. | 5% | 2006 Q1 |
| CLIENT 2 | CORE | N.A. | RESEARCH | MEDIA | N.A. | 5% | 2006 Q1 |
| CLIENT 2 | DERIV. | N.A. | RESEARCH | MEDIA | N.A. | 5% | 2006 Q1 |
| CLIENT 2 | CORE | N.A. | RESEARCH | PUBLISHING | N.A. | 7% | 2006 Q1 |
| CLIENT 2 | DERIV. | N.A. | RESEARCH | PUBLISHING | N.A. | 3% | 2006 Q1 |
| CLIENT 2 | CORE | N.A. | RESEARCH | BIOTECH | N.A. | 4% | 2006 Q1 |
| CLIENT 2 | DERIV. | N.A. | RESEARCH | BIOTECH | N.A. | 15% | 2006 Q1 |
| CLIENT 2 | CORE | N.A. | RESEARCH | CONSUMER | N.A. | 10% | 2006 Q1 |
| CLIENT 2 | DERIV. | N.A. | RESEARCH | CONSUMER | N.A. | 1% | 2007 Q1 |

INTERNAL REWARD POOLS TABLE 500

| REGION | DESK | DIV. | REWARD POOL | PERIOD |
|---|---|---|---|---|
| N.A. | CORE SALES TRADING | IED | $10M | 2006 Q1 |
| N.A. | DERIVATIVES | IED | $25M | 2006 Q1 |
| N.A. | STRUCTURES | IED | $10M | 2006 Q1 |
| N.A. | CONVERTS | FID | $1M | 2006 Q1 |
| N.A. | COMMODITIES | FID | $2M | 2006 Q1 |
| EUROPE | PROP | IED | $30M | 2006 Q1 |
| EUROPE | QDS | IED | $500K | 2006 Q1 |
| EUROPE | CORE SALES | IED | $10M | 2006 Q1 |
| EUROPE | HIGH YIELD | FID | $2M | 2006 Q1 |

INTERNAL GROUP-TEAM REWARD POOL ALLOCATION TABLE 600

| CLIENT REGION | DESK | DIV. | GROUP | TEAM | TEAM REGION | ALLOCATION % | PERIOD |
|---|---|---|---|---|---|---|---|
| N.A. | CORE SALES TRADING | IED | RESEARCH | MEDIA | N.A. | 5% | 2006 Q1 |
| N.A. | CORE SALES TRADING | IED | RESEARCH | BIOTECH | N.A. | 7% | 2006 Q1 |
| N.A. | CORE SALES TRADING | IED | RESEARCH | PUBLISHING | N.A. | 3% | 2006 Q1 |
| N.A. | CORE SALES TRADING | FID | RESEARCH | ECONOMICS | N.A. | 1% | 2006 Q1 |
| N.A. | DERIVATIVE | FID | RESEARCH | LUXURY GDS | EUROPE | 5% | 2006 Q1 |
| N.A. | DERIVATIVE | IED | RESEARCH | MEDIA | N.A. | 7% | 2006 Q1 |
| N.A. | DERIVATIVE | IED | RESEARCH | BANK | EUROPE | 5% | 2006 Q1 |

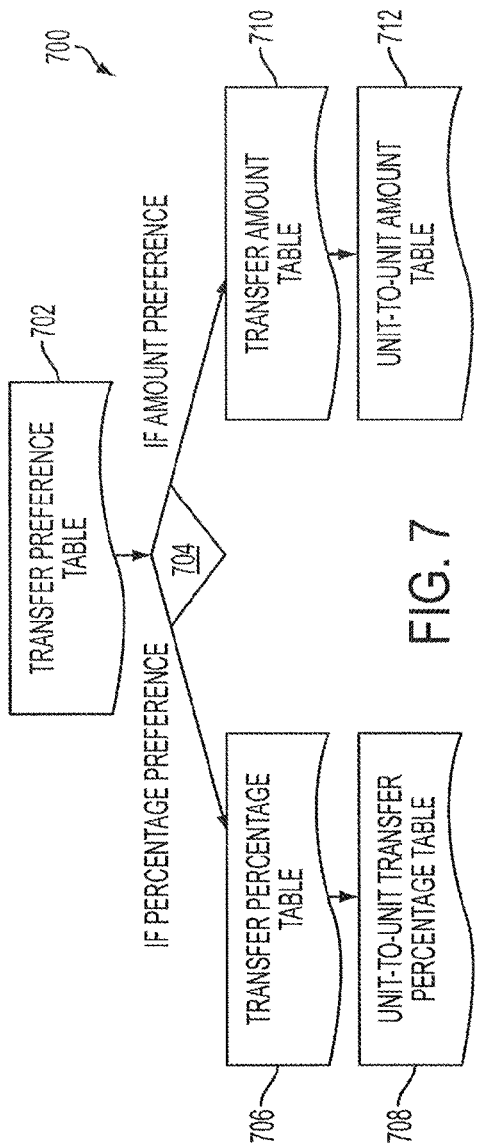

FIG. 7

TRANSFER PREFERENCE TABLE _702_

| GROUP | REGION | TEAM | PREFERENCE | PERIOD |
|---|---|---|---|---|
| RESEARCH | N.A. | BIOTECH | PERCENTAGE | 2006 Q1 |
| RESEARCH | N.A. | MEDIA | AMOUNT | 2006 Q1 |
| RESEARCH | EUROPE | BANK | PERCENTAGE | 2006 Q1 |
| RESEARCH | ASIA | TELECOM | AMOUNT | 2006 Q1 |

TRANSFER PERCENTAGE TABLE _706_

| GROUP | REGION | TEAM | PERCENTAGE | PERIOD |
|---|---|---|---|---|
| RESEARCH | N.A. | BIOTECH | 5% | 2006 Q1 |
| RESEARCH | EUROPE | BANKS | 10% | 2006 Q1 |

UNIT-TO-UNIT TRANSFER PERCENTAGE TABLE _708_

| SENDING GROUP | SENDING REGION | SENDING TEAM | RECEIVING GROUP | RECEIVING REGION | RECEIVING TEAM | PERCENTAGE TO RECEIVING TEAM |
|---|---|---|---|---|---|---|
| RESEARCH | EUROPE | BANKS | RESEARCH SALES | EUROPE | FRANCE SALES | 5% |
| RESEARCH | EUROPE | BANKS | RESEARCH SALES | EUROPE | BANKS SPECIALIST | 80% |
| RESEARCH | EUROPE | BANKS | RESEARCH | EUROPE | BROKERAGE | 5% |
| RESEARCH | EUROPE | BANKS | RESEARCH | JAPAN | BANKS SPECIALIST | 10% |

TRANSFER AMOUNT TABLE 710

| GROUP | REGION | TEAM | AMOUNT | PERIOD |
|---|---|---|---|---|
| RESEARCH | N.A. | MEDIA | $200K | 2006 Q1 |
| RESEARCH | ASIA | TELECOM | $300K | 2006 Q1 |

UNIT-TO-UNIT TRANSFER AMOUNT TABLE

| SENDING GROUP | SENDING REGION | SENDING TEAM | RECEIVING GROUP | RECEIVING REGION | RECEIVING TEAM | AMOUNT TO RECEIVING TEAM |
|---|---|---|---|---|---|---|
| RESEARCH | N.A. | MEDIA | RESEARCH SALES | N.A. | TEAM A | $100K |
| RESEARCH | N.A. | MEDIA | RESEARCH SALES | N.A. | TEAM B | $24K |
| RESEARCH | N.A. | MEDIA | RESEARCH SALES | EUROPE | MEDIA | $25K |
| RESEARCH | N.A. | MEDIA | RESEARCH SALES | N.A. | TELECOM | $50K |

PROFIT AND LOSS TABLE

| CLIENTS | REVENUES | EXPENSES | PBT | PBT/HOUR | RANK |
|---|---|---|---|---|---|
| CLIENT A | | | | | |
| INDIVIDUAL 1 | 15,000 | 6,250 | 8,750 | 350 | 6 |
| INDIVIDUAL 2 | 3,000 | 5,270 | (2,270) | (86) | 12 |
| TOTAL | 18,000 | 11,520 | 6,480 | 126 | |
| CLIENT BANK | | | | | |
| CLIENT B | 30,000 | 4,000 | 26,000 | 5,200 | 1 |
| FIDELITY | | | | | |
| INDIVIDUAL 3 | 2,200 | 3,250 | (1,050) | (65) | 11 |
| INDIVIDUAL 4 | 5,400 | 1,200 | 4,200 | 700 | 5 |
| INDIVIDUAL 5 | 1,200 | 2,250 | (1,050) | (93) | 12 |
| INDIVIDUAL 6 | 3,250 | 1,543 | 1707 | 341 | 7 |
| TOTAL | 12,050 | 8,243 | 3,807 | 99 | |
| EQUITY DERIVATES (INTERNAL) | | | | | |
| INDIVIDUAL 7 | 15,000 | 3,250 | 11,750 | 723 | 4 |
| INDIVIDUAL 8 | 50,000 | 2,010 | 47,990 | 4,775 | 2 |
| INDIVIDUAL 9 | 0 | 750 | (750) | (200) | 14 |
| INDIVIDUAL 10 | 10,000 | 10,000 | 0 | 0 | 10 |
| TOTAL | 75,000 | 16,010 | 58,990 | 737 | |
| PROP TRADING (INTERNAL) | | | | | |
| INDIVIDUAL 11 | 75,000 | 5,240 | 69,760 | 2,663 | 3 |
| INDIVIDUAL 12 | 5,000 | 3,250 | 1,750 | 108 | 9 |
| INDIVIDUAL 13 | 25,000 | 10,000 | 15,000 | 300 | 8 |
| TOTAL | 105,000 | 18,490 | 86,510 | 936 | |
| COVERAGE SHARE | 277,777 | NA | 277,777 | NA | 34 |
| INVESTMENT BANKING SERVICES | 310,000 | 425,000 | (115,000) | (80) | 7 |
| VETTINGS (STANDARD FEE) | 125,000 | 110,000 | 15,000 | 95 | 28 |
| FRANCHISE FEE SHARE | 111,000 | 80,250 | 30,750 | NA | 48 |
| SOFTWARE FEE SHARE | 225,750 | NA | 225,750 | NA | |
| RETAIL SHARE | 111,111 | 155,000 | (43,889) | NA | 14 |
| CONTENT ACCESS FEE SHARE | 260,000 | 75,000 | 185,000 | NA | 18 |
| TOTAL PROFIT AND LOSS | 1,785,688 | 1,013,513.00 | 772,175 | 402 | 23 |

FIG. 13

PROFIT MODEL FOR NON-EXECUTION SERVICES

BACKGROUND

In the financial services industry, sell-side firms have traditionally priced the non-execution services that they provide to their clients (e.g., equity research) by bundling the non-execution services with execution services, such as the buying and selling of securities, etc. According to typical bundling arrangements, clients (e.g., buy-side firms) pay the sell-side firm suitable compensation, for example, in the form of a fee and/or commission. In exchange for the compensation, the clients receive execution services as well as certain non-execution services, such as access to equity and other financial research.

For various reasons, these traditional bundling arrangements have begun to fall into disfavor. The Financial Services Authority ("FSA") of the United Kingdom has implemented regulations that will soon require many buy-side firms to disclose the amount of money that they spend on execution services and the amount of money that they spend on non-execution services, such as research and sales coverage. Accordingly, buy-side firms subject to the U.K. regulations must be able to break out their expenses related to execution and non-execution services respectively. Also, under typical bundling arrangements, research and other non-execution services are a cost center to the sell-side firm, and not a profit center. Accordingly, there is a need for improved pricing and resource allocation systems for non-execution services.

SUMMARY

In one general aspect, the invention is directed to methods of determining the profitability of a unit of a division of a firm. The firm may have an execution service provider division and a non-execution service provider division. In various embodiments, the methods may comprise the steps of accruing a payment for execution and non-execution services from an external client, and allocating a first portion of the payment to the execution service provider division and a second portion of the payment to the non-execution service provider division. The methods may further comprise the steps of allocating a portion of the second portion of the payment to a unit of the non-execution service provider division, and calculating a cost of providing the non-execution services of the unit to the client. The methods may further comprise the step of calculating a profit of the non-execution service provider unit to service the client considering the cost of providing the non-execution services to the client and the portion of the second portion of the payment allocated to the unit.

Also, payment allocations from an internal client of the firm can be allocated to units of non-execution service provider division, and the cost to the units of providing service to the internal clients can be determined. Based on that information, the profit of the units to service the internal clients of the firm can be determined. In various embodiments, the resources of the various units of the non-execution service provider division may be allocated to different clients, internal and external, based on the profit of the units in serving particular clients.

BRIEF DESCRIPTION OF THE FIGURES

Embodiments of the present invention are described herein, by way of example, in conjunction with the following figures, wherein:

FIGS. 2-6 show tables according to various embodiments of the present invention;

FIG. 7 shows a chart illustrating a workflow according to various embodiments of the present invention;

FIGS. 8-13 show tables according to various embodiments of the present invention.

DETAILED DESCRIPTION OF THE INVENTION

Sell-side financial services firms typically include, among other components, an execution service division and a non-execution service division. The non-execution service division may contain one or more non-execution service provider units (e.g., research and/or sales groups, teams, analysts, etc.). Embodiments of the present invention are directed in general to techniques for determining the profits and losses (or revenue and expenses) for non-execution service provider units (e.g., research analysts and sales professionals of sell-side firms and groupings thereof) and creating a market for the resources of non-execution service provider units. The service provider units may use this information in a number of ways. For example, the service provider units may consider profits and losses as economic signals to allocate their resources to service the needs of their clients. Profits and losses may also be used to determine a value provided by various non-execution service provider units, which may, in turn, affect how much the firm invests in particular non-execution service provider units as well as compensation issues for individuals therein.

Revenue for the non-execution service provider division and units thereof may come from various sources including, for example, diverted fees paid for execution services, diverted revenue from internal clients, fixed fees for services, etc. The revenue may be compared to costs and the resulting profit margins broken down by client and provided to the service provider units. The service provider units may then be given the flexibility to allocate their discretionary resources accordingly. For example, clients who give the service provider units a relatively high amount of revenue and/or profit may receive a correspondingly high portion of the service provider units' discretionary resources.

For embodiments where the service provider is a sell-side firm that performs equity research and trade execution, the non-execution service provider units may be equity research groups, teams, and/or single analysts within the financial services firm. For example, a research team may include a primary analyst and several research associates. The service provider units' revenue may originate from external clients of the firm (e.g., through fee diversions, commission sharing, hard money, etc.) and/or from internal clients, (e.g., through reward pools, transfers, etc.). In this way, the various internal and external clients may compete with each other for the discretionary resources of the research group (e.g., visits, phone calls, and access to financial analysts).

Figure 1:
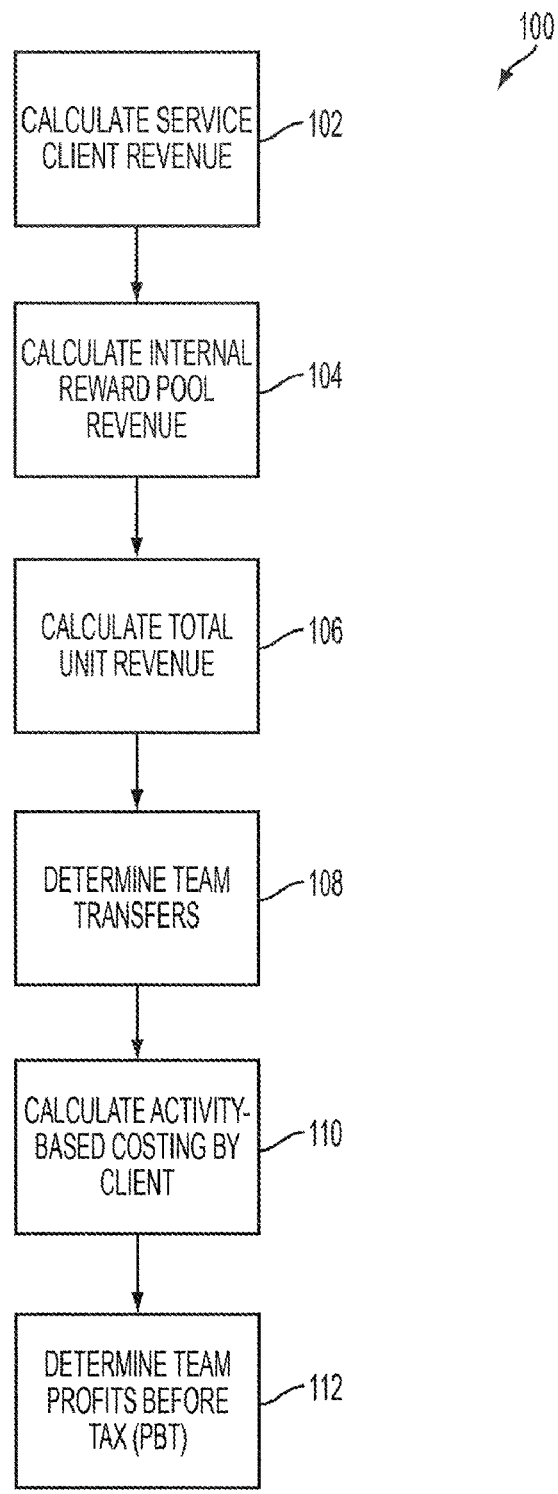
FIG. 1 shows a flow chart illustrating a process flow according to various embodiments of the present invention.

FIG. 1 shows a flow chart illustrating a process flow 100 according to various embodiments. At step 102 the service client revenue to non-execution service provider units of the firm is calculated. Service client revenue may include, for example, revenue diverted to the non-execution service provider division of the firm from the fees paid by external clients for execution services. This revenue may then be allocated to individual units of the non-execution service provider division, for example, based on feedback from external clients about the value provided by the respective units. FIG. 2 shows a chart 200 illustrating an example of the total fees paid by various clients for execution services in various products over a given time period. Each row of the chart 200 shows the revenue (column 208) generated from a client (column 202) for transactions involving a particular product or product type (column 204) in a particular region (column 206) over a given time period (column 210). It will be appreciated that the total revenue from a client may be broken into more or fewer categories having more or less detail than those shown by the chart 200.

A portion of the revenue shown above in column 208 may be diverted from the relevant execution service units (e.g., prime brokerage, secondary sales, swaps, convertibles, structured products, etc.), with the diverted portion forming the service client revenue to the non-execution service provider division and its constituent units. The diverted portion may be a percentage of the total revenue or a fixed amount. For example, FIG. 3 shows a chart 300 with a percentage (column 314) of the revenue from a given client (column 302) and product (column 304) allocated to a non-execution services group (column 312). It will be appreciated that the diverted percentage of the revenue from any product group (column 304) and region (column 306) may not exceed 100%. In various embodiments, the diverted amount or percentage of revenue from a product group and region may be divided among multiple teams, or units, of a non-execution services division. For example, FIG. 4 shows a chart 400 showing the percentages of the total diverted revenue assigned to a research team (column 418) and region (column 420) of a group (column 412) for a given client (column 402), product (column 404), region (column 406) and time period (column 410).

In various embodiments, the amount of revenue diverted to any particular non-execution service provider unit may be determined by the firm, or by the client. For example, if the client does not designate the portions of their fees to be diverted to the non-execution service provider division and specific units thereof, the firm may estimate the amounts to divert to the division and units based on acceptable criteria (e.g., surveys of similarly situated clients, information specific to the field of the client, percentage of market cap traded, popularity of particular non-execution service provider units, etc.). It will be appreciated, however, that clients may have incentive to select accurate diversion portions. For example, if not enough of the client's fees are diverted to non-execution service provider division in general, or to particular non-execution service provider units that the client depends on, the respective non-execution service provider units may devote less of their discretionary resources to the client, resulting in an undesirable drop in service (from the standpoint of the client). On the other hand, if the client diverts too much of its fees to the non-execution service provider division, then the execution service provider units, from whom the fees are diverted, may reduce their level of service to the client. In this way, incentive is created for the client to specify an optimal split of their fees between execution and non-execution units.

Referring back to the process flow 100, internal reward pool revenue to the various non-execution service provider units may be calculated at step 104. It will be appreciated that many non-execution service provider units, such as research groups and teams at financial service firms, serve internal as well as external clients. Internal clients may include various trading desks and other resources within the firm that rely on the non-execution service provider units for support, such as research and analysis. Also, various trading desks and other execution service provider units may rely on research sales to cross-sell external clients. In one example, an external client may decide (e.g., based on research) that it would like to be exposed to a certain discrete risk (e.g., one, but not all, of the business lines of a particular corporation). In this case, a research sales team may refer the client to an execution service provider unit, such as a derivatives or structured products team, who may design a security that exposes the external client to the desired risk.

It will be appreciated that the execution service provider division and units thereof may want to create incentives for the non-execution service provider division and units who provide them with research, refer external clients to them, or otherwise add value. Accordingly, each internal client may set up a reward pool out of its own revenues to provide income to selected non-execution service provider units, and accordingly give the non-execution service provider units incentive to devote discretionary resources to the internal client. The reward pools allocated to the provider units preferably count as expenses to the internal clients. In various embodiments, the reward pools may be established periodically. For example, an internal client may designate a portion of its quarterly revenue to a reward pool. The size of the reward pool provided by a particular internal client may fluctuate based on the non-execution service provider unit's ability to provide value, as well as the amount set by competing bids for the time of the non-execution service provider. In this way, internal clients of the non-execution service provider units may be placed in competition with external clients for the resources of the non-execution service provider units.

FIG. 5 shows a chart 500 illustrating exemplary reward pools (column 508) established by various internal clients, who are designated in chart 500 by region (column 502), desk (column 504) and division (column 506), over a given time period (column 510). In various embodiments, the internal clients may direct portions of their respective reward pools (column 508) to particular non-execution service provider units. For example, FIG. 6 shows a chart 600 illustrating exemplary allocations by internal clients of reward pools (column 618) to non-execution service provider units, designated in chart 600 by group (column 612), team (column 614) and team region (column 616). It will be appreciated that the allocations to a particular non-execution service provider unit may be determined by any entity including, for example, the internal client itself, firm management, etc. It will also be appreciated that any portion of a reward pool that is not allocated to a particular non-execution service provider unit may carry over to the next quarter, year, etc., or revert back to the originating internal client.

Referring back to the process flow 100, the total revenue for each non-execution service provider unit may be found at step 106. The total revenue may include various revenue sources such as the service client revenue and internal reward pool revenue calculated at steps 102 and 104 respectively. The total revenue may also include other forms of revenue (e.g., flat fee revenue, output-based revenue, etc.). For example, financial research groups and teams often perform flat fee work for vetting potential transactions, performing due diligence reviews of investment banking transactions, conducting sales force and investor education, and providing other services. The amount of the flat fees may vary across non-execution service units and may be based on the popularity and cost of the unit, competing demands on the unit's time, etc. The flat fees from these other revenues may be included in the total revenue found at step 106. As another example, some clients (internal and/or external) of non-execution service provider units may not be interested in discretionary resources of the units and instead may only be interested in concrete products produced by the units. For example, some clients of financial research groups and/or teams may only be interested in generated reports, and not as interested the analysts explanations of the reports or other support. These clients may therefore pay the non-execution service provider a unit price per product used (e.g., research reports), or a single subscription fee that allows them to access an entire library or repository of reports. The revenue from the price-per-product or subscription fee may be pushed down to individual non-execution service provider units based on the contribution of the units to the products used. For example, in subscription fee setting, if the reports of a first research team are more commonly accessed than those of a second, then the first team may receive a higher proportion of a subscription fee.

In various embodiments, firm management may collect a portion of the total revenue of a non-execution service provider unit for redistribution to other units. This portion may be a fixed amount or a percentage of each non-execution service provider unit's total revenue. The sell-side firm management may distribute the total collected amount according to desired management objectives. For example, sell-side firm management may distribute portions of the total collected amount to non-execution service provider units that the firm management wants to grow (e.g., in anticipation of unrealized future demand).

Referring back to the process flow 100, according to various embodiments, transfers between non-execution service provider units may determined at step 108. It will be appreciated that the clients of any given non-execution service provider unit may include other non-execution service provider units. For example, research groups, teams and/or analysts at financial services firms may rely on the results of other research groups and/or teams in preparing their own analyses. Therefore, it may be desirable for non-execution service provider units to direct a portion of their own revenue to other units to give the other units incentive to devote discretionary resources to the directing unit.

FIG. 7 shows a workflow 700 for determining transfers between non-execution service provider units according to various embodiments. Non-execution service provider units may first earmark a portion of their revenue to be transferred, and then allocate that portion to particular non-execution service provider units. In various embodiments, any of the earmarked amount that is not allocated may carry over to the next quarter, year, etc., or revert back to the original non-execution service provider unit. It will be appreciated that non-execution service provider units may prefer to earmark a set amount or a percentage of their own revenue. Each unit may determine whether it prefers to transfer an amount, or a percentage of total revenues at decision block 704. The results of the decision for each non-execution service provider unit may be recorded at a Transfer Preference table 702, for example, shown in FIG. 8. The table 702 shows whether the individual non-execution service provider units, designated by group (column 802), region (column 804) and team (column 806), prefer to transfer a percentage of their total revenue or an amount (column 808) over a given time period (column 810).

Non-execution service provider units that choose to transfer a percentage of their total revenue may select the percentage, or have it selected for them. The chosen percentage may be recorded at a Transfer Percentage table 706, for example, as shown in FIG. 9. In the table 706 each non-execution service provider unit, designated by group (column 902), region (column 904) and team (column 906), may be associated with a selected revenue percentage (column 908) over a given time period (column 910). The non-execution service provider units may also select, or have selected for them (e.g., by sell-side firm management), the amounts of the transferred portion that are directed to specific other non-execution service provider units. For example, FIG. 10 shows an exemplary Unit-To-Unit Transfer Percentage table 708. The table 708 designates the percentage of a sending non-execution service provider unit's total transferred portion (column 1014) that is transferred to by the sending unit, designated by group (column 1002), region (column 1004) and team (column 1006), to a receiving unit, designated by group (column 1008), region (column 1010) and team (column 1012).

Non-execution service provider units may also choose to transfer a lump sum to other units, rather than a percentage of their revenue. FIG. 11 shows an exemplary Transfer Amount table 710 listing non-execution service provider units, designated by group (column 1102), region (column 1104) and team (column 1106), and the amount (column 1108) that they will transfer to other units over a given time period (column 1110). FIG. 12 shows an exemplary Unit-To-Unit Transfer Amount table 712 showing the amounts (column 1216) of non-execution service provider units' total transferred portion that the units, designated by group (column 1204), region (column 1206) and team (column 1208), transfer to other units, designated by group (column 1210), region (column 1212), and team (column 1204).

It will be appreciated that the various methods for calculating a portion of the revenue of each non-execution service provider unit that will be transferred to other units, and the amount of the portion directed to each individual non-execution service provider unit may be determined according to any suitable method. For example, each non-execution service provider unit may designate a percentage of its total revenue for transfer, and then designate an amount of the percentage to particular units. Also, for example, each non-execution service provider unit may designate an amount for transfer, and then designate a percentage of the amount to particular units. It will also be appreciated that the sum of all of a non-execution service provider unit's revenue, minus outgoing transfers, plus incoming transfers, will be the net revenue of the non-execution service provider unit.

Referring back to the process flow 100, the expenses of the non-execution service provider unit may be calculated at step 110. The expenses may be broken down by client and service provider unit, allowing a non-execution service provider unit to know its costs for servicing each of its internal and external clients. The expenses of the non-execution service provider unit may be found according to any suitable methods, for example, one or more of the methods disclosed in U.S. patent application Ser. No. 10/857,526, filed on May 28, 2004 and entitled, "Systems and Method For Determining The Cost Of A Securities Research Department To Service A Client Of The Department," which is incorporated herein by reference. U.S. patent application Ser. No. 10/856,442, filed on May 28, 2004 and entitled, "Pricing Unbundled Equity Research" and U.S. patent application Ser. No. 10/939,087, filed on Sep. 10, 2004 and entitled, "Systems and Methods For Auctioning Access To Securities Research Resources," are also incorporated herein by reference.

The net revenues and expenses of each non-execution service provider unit may be aggregated to determine profits before tax (PBT) at step 112. FIG. 13 shows an exemplary Profit and Loss (P&L) table 1300 breaking down the PBT for a particular non-execution service provider unit. Clients and other revenue sources of the unit are shown at column 1302. The revenues associated with a client or revenue source are shown at column 1304, and expenses at column 1306. The total PBT for a client or revenue source is shown at column 1308 and the PBT per hour expended on a client or revenue source is shown at column 1310. Column 1312 includes a rank of each client and revenue source in PBT/hour. Referring to the clients/revenue sources, the rows indicated by 1314 show external clients; the rows indicated by 1315 show internal clients, and the rows indicated by 1316 show fixed fee or other fee-based revenue. In various embodiments, the PBT data for a client may be broken down by individuals associated with the client. For example, individuals 1 and 2 are associated with client A in chart 1300. A PBT and PBT/hour may be provided not only for the client as a whole, but for each individual associated therewith. It will be appreciated that a P&L table may be created describing non-execution service provider units at various levels of the division. For example, a manager-level report may describe the P&L of each of the analysts and associates under the manager's direct control; a regional report may describe the P&L of all manager's in a given region; and a global report may show the P&L of the entire non-execution service provider division. Also, a client-level report may show P&L for the client based on the non-execution service provider groups that the client uses.

It will be appreciated that some of the steps shown in the process flow 100 may be omitted, or performed in an alternative order. For example, for non-execution service provider units who serve only external clients, it may not be necessary to calculate internal reward pool data at step 104 or determine team transfers at step 108. Also, various categorizations of non-execution service provider units (e.g., teams and groups) are used herein. It will be appreciated, however, that non-execution service provider units may be categorized or grouped in any way to include any desired number of nested or un-nested components.

Figure 14:
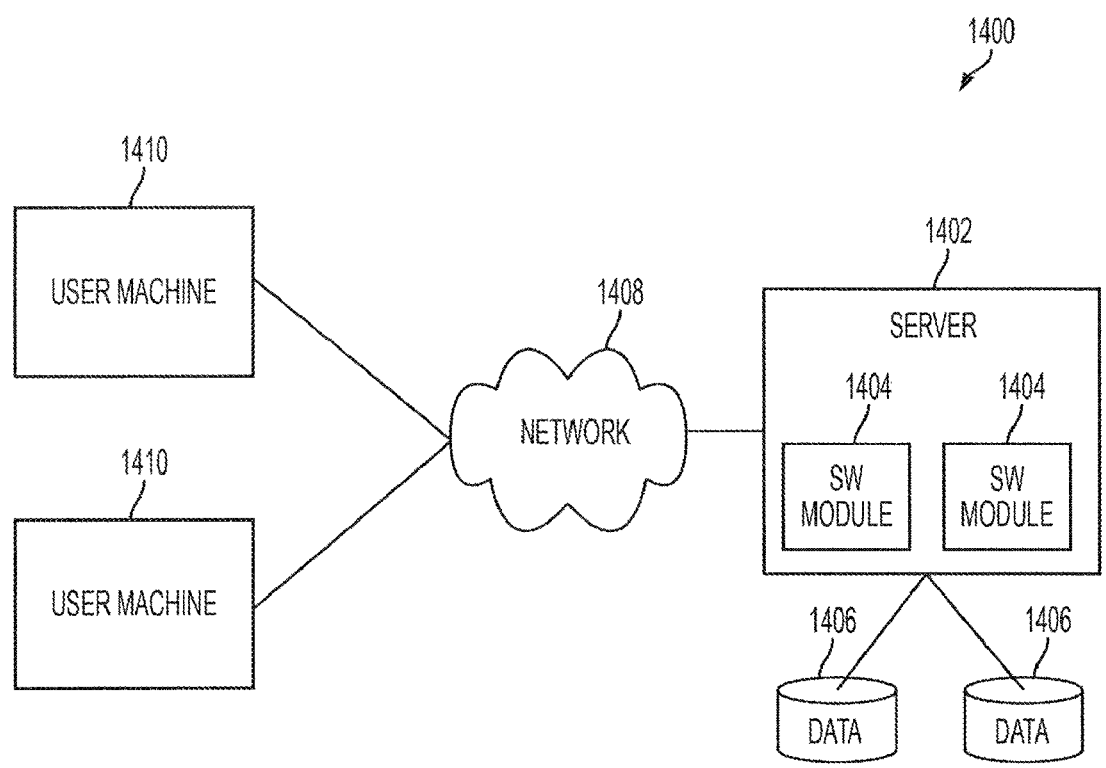
FIG. 14 shows a block diagram of a computer system according to various embodiments of the present invention.

FIG. 14 shows a computer system 1400 according to various embodiments. The computer system 1400 may be used to calculate, track and/or monitor the revenues, expenses, and/or profits of the various non-execution service provider units and/or the non-execution service provider division as a whole. The computer system 1400 may include a server 1402, user machines 1410 and databases 1406. The various components 1402, 1410, 1406 may communicate with one another by utilizing a wired or wireless network 1408 that may be, for example, a local area network (LAN) or wide area network (WAN).

The server 1402 may execute one or more software modules 1404. Each of the software modules 1404 may perform a calculation or task for monitoring the revenues, expenses and/or profits of the various non-execution service provider units. For example, one module 1404 may track the service client revenue of each non-execution service provider unit. Total fees received from each client may be divided between the execution service provider unit and the non-execution service provider unit according to the description above. Another of the modules 1404 may track the transfer payments between non-execution service provider units, including the total portion of the revenue of each unit that is to be transferred, and the amount of the total portion that is to be transferred to each other non-execution service provider unit. Data necessary to perform the calculations, such as, for example, the data included in tables may be included in one or more of databases 1406.

In various embodiments, the server 1402 may execute a software module 1404 for performing data mining and predictive modeling of non-execution service provider income. For example, the cost of service from particular non-execution service provider units may be estimated based on the average prices and price ranges for the unit and/or similar in previous years, quarters, etc. Also, the amount that a particular client of a non-execution service provider will have to pay to receive an adequate level of service may be estimated by analyzing similar clients with similar accounts. In this way, suggested prices for non-execution service provider units may be given to prospective clients.

A user (e.g., an individual associated with a non-execution service provider unit, a member of firm management, etc.) may access the results of calculations performed at the server 1402 from a user machine 1410 via network 1408. For example, the user machine 1410 may provide one or more user interfaces to the user. It will be appreciated that the user interfaces may be provided in any acceptable format including, for example, an e-mail message, a web page, a dedicated application, etc. The user interfaces may correspond to one or more of tables 200, 300, 400, 500, 600, 702, 704, 706, 708, 710, 712, and 1300 described above. It will be appreciated that, in various embodiments, the user machines 1410 may also have some or all of the functionality of the server 1402 and modules 1404, as well as access to databases 1406. In this way, the user machines 1410 may operate independent of the server 1402.

It is to be understood that the figures and descriptions of the present invention have been simplified to illustrate elements that are relevant for a clear understanding of the present invention, while eliminating, for purposes of clarity, other elements, such as, for example, some specific tasks of the non-execution service provider units described above, etc. Those of ordinary skill in the art will recognize that these and other elements may be desirable. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The various modules 1404 of the system 1400 may be implemented as software code to be executed by a processor(s) of the system 1400 or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

I claim:

1. A computer-implemented method of determining the profitability of a non-execution service provider unit of a non-execution service provider division of a firm, the firm comprising an execution service provider division and the a non-execution service provider division, the method comprising:
receiving, by a computer device, an indication of a payment for execution and non-execution services from an external client, wherein the computer device comprises at least one processor and operatively associated memory;
receiving, by the computer device, an indication of an allocation of a first portion of the payment to the execution service provider division and an allocation of a second portion of the payment to the non-execution service provider division;
receiving, by the computer device, an indication of an allocation of a portion of the second portion of the payment to the non-execution service provider unit;
calculating, by the computer device, a cost of providing the non-execution services of the non-execution service provider unit to the external client; and
calculating, by the computer device, a profit of the non-execution service provider unit to service the external client considering the cost of providing the non-execution services to the external client and the portion of the second portion of the payment allocated to the non-execution service provider unit.

2. The method of claim 1, further comprising:
receiving, by the computer device, an indication of an allocation of a second payment from a second external client for other execution and other non-execution services;
receiving, by the computer device, an indication of an allocation of a first portion of the second payment to the execution service provider division and an allocation of a second portion of the second payment to the non-execution service provider division; and
receiving, by the computer device, an indication of an allocation of a portion of the second portion of the second payment to the non-execution service provider unit of the non-execution service provider division;
calculating, by the computer device, a second profit of the non-execution service provider unit to service the second external client considering a cost of providing the non-execution services of the non-execution service provider unit to the second external client, and the portion of second portion of the second payment.

3. The method of claim 2, further comprising allocating, by the computer device, a resource of the non-execution service provider unit to either the external client or the second external client based on the profit and the second profit.

4. The method of claim 1, further comprising:
receiving, by the computer device, an indication of an allocation of a first amount from an internal client to the non-execution service provider unit;
calculating, by the computer device a cost to the non-execution service provider unit of providing non-execution services to the internal client; and
calculating, by the computer device, a third profit of the non-execution service provider unit considering the first amount and the cost of providing non-execution services to the internal client.

5. The method of claim 4, further comprising allocating, by the computer device, a resource of the non-execution service provider unit to either the external client or the internal client based on the first profit and the third profit.

6. The method of claim 4, wherein the internal client is a unit of the execution service provider division.

7. The method of claim 4, wherein the internal client is a second non-execution service provider unit.

8. The method of claim 1, wherein an amount of the second portion of the payment is determined by the external client.

9. The method of claim 1, wherein an amount of the portion of the second portion of the payment is determined by the external client.

10. The method of claim 1, wherein an amount of the second portion of the payment is determined by the computer device.

11. The method of claim 10, further comprising determining, by the computer device, the amount of the second portion of the payment based on at least one of the group consisting of at least one survey of similar external clients, information specific to the field of the eternal client, and a popularity of the non-execution service provider unit.

12. The method of claim 1, further comprising the computer device providing a user interface, the user interface comprising a representation of the profit of the non-execution service provider unit.

13. The method of claim 1, further comprising allocating an amount of funding to the non-execution service provider unit, by the computer device, wherein the amount is dependent on the profit of the non-execution service provider unit.

14. The method of claim 1, further comprising:
receiving, by the computer device, an indication of a fee for services of the non-execution service provider unit;
finding, by the computer device, a cost to the non-execution service provider unit of providing the services, and wherein calculating the profit of the non-execution service provider unit comprises considering the fee and the cost.

15. A computer-implemented method of determining the profitability of a non-execution service provider unit of a firm, the method comprising:
receiving, by a computer device, an allocation from a first internal client, wherein the computer device comprises at least one processor and operatively associated memory;
receiving an allocation from a second internal client;
calculating, by the computer device, a cost of providing non-execution services by the non-execution service provider unit to the first internal client;
calculating, by the computer device, a cost of providing non-execution services by the non-execution service provider unit to the second internal client;
calculating, by the computer device, a first profit of the non-execution service provider unit considering the allocation from the first internal client and the cost of providing non-execution services by the non-execution service provider unit to the first internal client; and
calculating, by the computer device, a second profit considering the allocation from the second internal client and the cost of providing non-execution services by the non-execution service provider unit to the second internal client.

16. The method of claim 15, further comprising allocating, by the computer device, a resource of the non-execution service provider unit to either the first or the second internal client based on the first and the second profit.

17. The method of claim 15, further comprising:
receiving, by a computer device, an indication of a payment for execution and non-execution services from an external client;
receiving, by the computer device, an indication of an allocation of a first portion of the payment to an execution services provider unit and an allocation of a second portion of the payment to the non-execution service provider unit;
calculating, by the computer device, a cost to the non-execution service provider unit of providing non-execution services to the external client;
calculating, by the computer device, a third profit considering the cost of providing non-execution services to the external client and the second portion of the payment; and
allocating, by the computer device a resource of the non-execution service provider unit to at least one client selected from the group consisting of the first internal client, the second internal client, and the external client, wherein the allocating comprises considering the first, second and third profits.

18. The method of claim 15, wherein the allocation from the first internal client is taken from a reward pool established by the first internal client from its own revenue.

19. The method of claim 1, further comprising receiving, by the computer device, a second allocation from the first internal client, wherein the second allocation is directed to a second non-execution service provider unit.

20. The method of claim 18, wherein the reward pool is at least one of a predetermined amount and a percentage of the first internal client's total revenue.

21. The method of 18, wherein the reward pool is an expense item for the first internal client.

22. The method of claim 18, further comprising, the computer device redirecting a portion of the reward pool to a second non-execution service provider unit.

23. The method of claim 15, wherein the first internal client is at least one of an execution service provider unit and a second non-execution service provider unit.

24. A computer-implemented method of determining the profits of a non-execution service provider division within a firm, wherein the non-execution service provider division comprises a plurality of non-execution service provider units, the method comprising:

summing, by a computer device, a first revenue of each of the non-execution service provider units derived from fees received from external clients for execution services, wherein the computer device comprises at least one processor and operatively associated memory;
summing, by the computer device, a second revenue of each of the non-execution service provider units derived from execution service provider units within the firm;
redistributing, by the computer device, a portion of the first revenue and the second revenue from at least a first of the non-execution service provider units to at least a second of the non-execution service provider units;
calculating, by the computer device, a cost incurred by the non-execution service provider units to provide service to external clients in relation to the execution services;
calculating, by the computer device, a cost incurred by the non-execution service provider units to provide service to the execution services provider units;
calculating by the computer device a cost to each of the non-execution service provider units of providing service to other non-execution service provider units; and
finding a profit of each non-execution service provider unit.

25. The method of claim 24, further comprising determining, by the computer device at least one of an investment in the non-execution service provider unit and a compensation for individuals included in the non-execution service provider unit, wherein the determining comprises considering the profit of each non-execution service provider unit.

26. The method of claim 24, further comprising receiving, by the computer device, and from the first of the non-execution service provider units, an indication of at least a part of the redistributed portion.

27. The method of claim 24, wherein a portion of the redistributed portion is determined by the firm.

28. The method of claim 24, further comprising summing, by the computer device, a third revenue of each of the non-execution service provider units, wherein the third revenue includes at least one fixed fee from an external client.

29. The method of claim 24, further comprising deriving, by the computer device, a profit per client from the profit of each non-execution service provider unit.

30. The method of claim 24, further comprising finding, by the computer device, a profit of each non-execution service provider unit per unit time.

31. The method of claim 24, further comprising finding, by the computer device, an average profit per unit time for a plurality of the non-execution service provider units.

* * * * *